US008020476B2

(12) United States Patent
Hartmann et al.

(10) Patent No.: US 8,020,476 B2
(45) Date of Patent: Sep. 20, 2011

(54) PLATE-DIVIDING SYSTEM FOR DIVIDING PLATE-SHAPED WORKPIECES, AND METHOD FOR THE OPERATION THEREOF

(75) Inventors: Gerhard Hartmann, Ebhausen-Rotfelden (DE); Peter Groening, Deckenpfronn (DE); Werner Ziegler, Calw (DE)

(73) Assignee: HOLZMA Plattenaufteitechnik GmbH, Holzbronn (DE)

( * ) Notice: Subject to any disclaimer, the term of this patent is extended or adjusted under 35 U.S.C. 154(b) by 325 days.

(21) Appl. No.: 12/041,047

(22) Filed: Mar. 3, 2008

(65) Prior Publication Data

US 2008/0210070 A1 Sep. 4, 2008

(30) Foreign Application Priority Data

Mar. 2, 2007 (DE) .......................... 10 2007 010 207

(51) Int. Cl.
*B23D 47/04* (2006.01)
*B23Q 7/04* (2006.01)
*B27B 5/06* (2006.01)
(52) U.S. Cl. .......................................... 83/272; 83/277
(58) Field of Classification Search .............. 83/27, 34, 83/35, 36, 42, 44, 45, 151, 272, 277; 414/783, 414/788.6, 788.7, 790.2
See application file for complete search history.

(56) References Cited

U.S. PATENT DOCUMENTS

| 4,065,991 | A |   | 1/1978 | Benuzzi |
| 4,392,401 | A | * | 7/1983 | Ess ................................. 83/36 |
| 5,400,652 | A | * | 3/1995 | Haar .............................. 83/277 |
| 6,546,834 | B1 |  | 4/2003 | Benuzzi |

FOREIGN PATENT DOCUMENTS

| CH | 574314 | 4/1976 |
| DE | 37 16 651 | 2/1973 |
| DE | 3716651 | 12/1987 |
| DE | 37 37 228 A1 | 5/1988 |
| DE | 44 25 008 | 1/1996 |
| DE | 4425008 | 5/1996 |
| EP | 1510276 | 3/2007 |

OTHER PUBLICATIONS

Examination Report from DE 10 2007 010 207.2.
Written Search Report from parallel EP patent prosecution.
"FHM 180" of Shelling Anlagenbau GmbH.

* cited by examiner

*Primary Examiner* — Stephen Choi
(74) *Attorney, Agent, or Firm* — Brinks Hofer Gilson & Lione

(57) ABSTRACT

A plate dividing-system includes a first advancing device for moving plate-shaped workpieces, the first advancing device having a first support and a plurality of first gripping mechanisms, the plate dividing-system having a second advancing device for moving plate-shaped workpieces, the second advancing device having a second support and at least a second gripping mechanism. In addition, the plate dividing-system features a feed area that extends transversely to the advancing device, in which feed area the workpieces to be moved are arranged. The second support is arranged laterally outside the feed area and is movable in the direction of feed.

13 Claims, 8 Drawing Sheets

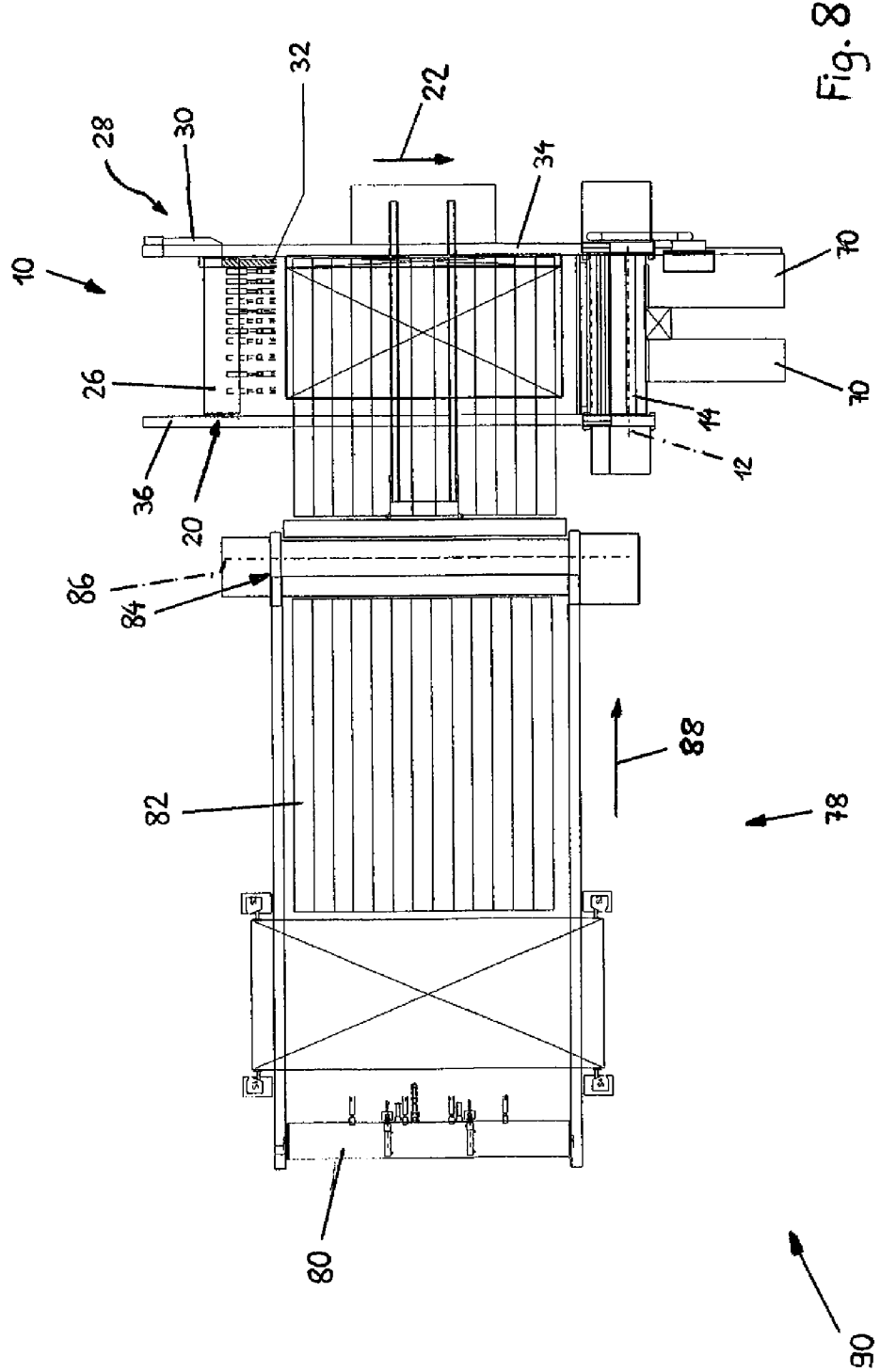

Figure 1:
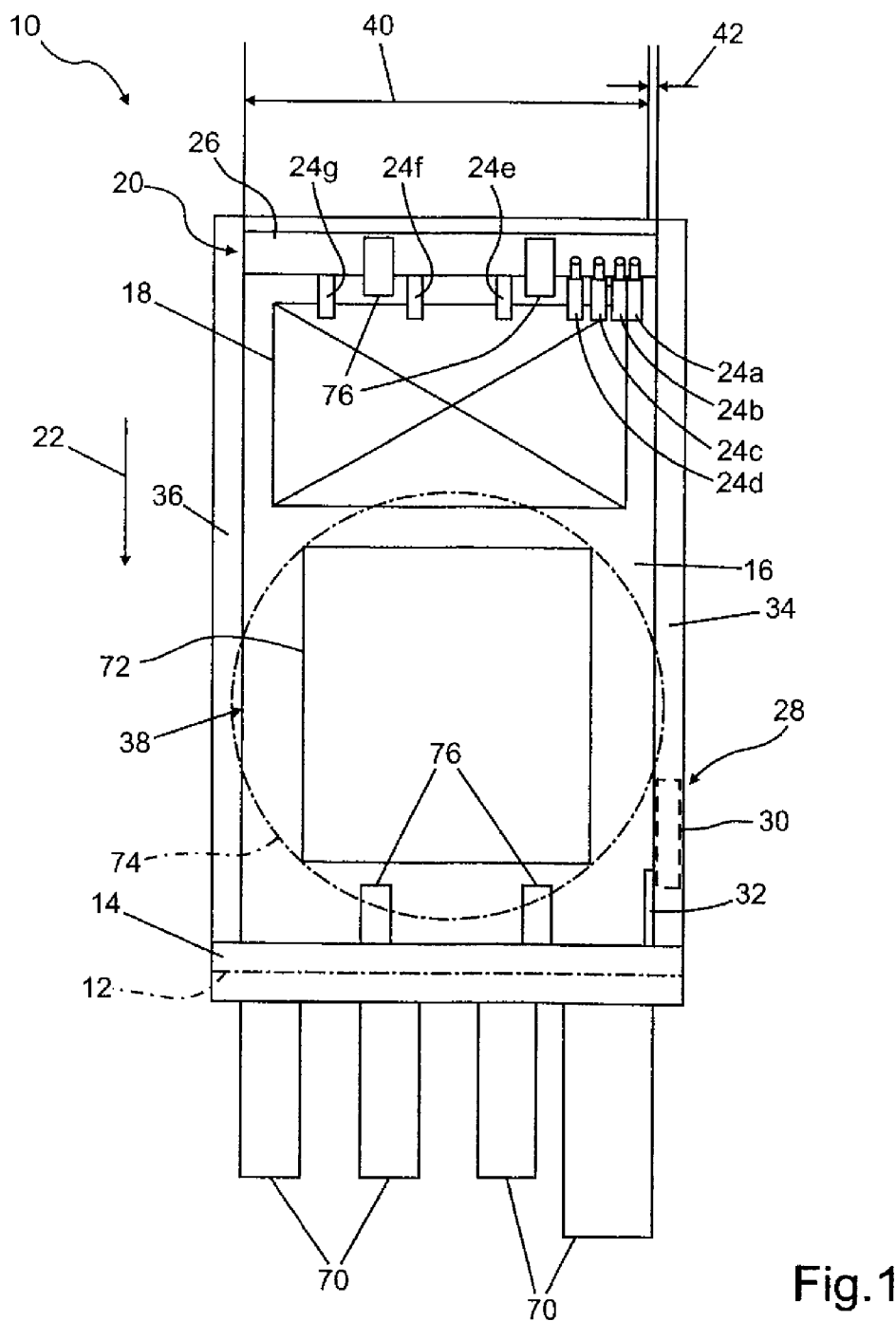

PLATE-DIVIDING SYSTEM FOR DIVIDING PLATE-SHAPED WORKPIECES, AND METHOD FOR THE OPERATION THEREOF

CROSS-REFERENCE TO RELATED APPLICATIONS

This application claims the benefit of DE 10 2007 010 201.2, filed Mar. 2, 2007. The disclosure of the above application is incorporated herein by reference.

FIELD

The invention relates to a plate dividing device for dividing plate-shaped workpieces according to the preamble of claim 1, as well as a method of operating the system according to the preamble of the subordinate patent claim.

BACKGROUND

The statements in this section merely provide background information related to the present disclosure and may not constitute prior art.

EP 1 510 276 A1 describes a plate divider-system with two advancing devices meshing into each other. The one advancing device comprises a portal that spans the feed area, which forms the first support of a first advancing device, and on which several first gripping mechanisms are affixed. A lateral carriage forms a second support of a second advancing device, and on this second carriage, a bracket with a plurality of second gripping mechanisms is affixed. The second working width, in which the second gripping mechanism is arranged, thereby overlaps with the first working width, in which the first advancing device, or as the case may be, the first gripping mechanism, is arranged. The first and second advancing device can be moved independently of each other, so that the two advancing devices respectively can simultaneously grip a stack of plates, and feed them to a saw, for example. To ensure that the second advancing device does not obstruct the first advancing device, the gripping mechanisms of the first advancing device can be pivoted upward and out of the way.

A disadvantage of the known plate divider-system is its technical complexity which, on the one hand, results in high maintenance costs and, on the other, is expensive to produce.

SUMMARY

The present invention is therefore based on the task of producing a plate divider-device that can be used as flexibly as possible, at the same time having low production and operating costs.

This task is resolved with a plate divider-system with the characteristics of claim 1 and by means of a procedure with the characteristics of the subordinate patent claim. Advantageous further embodiments are cited in the sub-claims. Characteristics that are essential to the invention are also seen in the following description and the drawing, whereby the characteristics of the invention can be essential for the invention, both as such and in various combinations, without explicit reference being made to this.

It was inventively recognized that almost all conventional panel cutting patterns, or as the case may be, dividing plans, can be realized even when the working widths do not overlap, and the second gripping mechanism cannot be moved outside the feed area, but rather is constantly arranged in the second working width. This results in considerable simplification of the plate divider-system, which already results in cost savings during manufacture. Furthermore, the inventive plate dividing-device can also be operated more cost-efficiently. Because the two working widths do not overlap, the height of the clearance underneath the second gripping mechanism is determined only by the maximum height of a stack of workpieces that can be gripped by the first gripping mechanism, not by the height of the first gripping mechanism itself. This also contributes to simplifying the plate divider-system. In addition, the plate divider-system can also be constructed of standard components, which lowers both its production and maintenance costs. In addition, the first and second advancing devices can be arranged in such a way, in a simple manner, particularly if the machine has a certain length, that they can work independently of each other and "in parallel," i.e. simultaneously.

In a first embodiment of the inventive panel-divider system, it is proposed that the first support and the second support be supported in a moveable way on a common third support that is arranged parallel to the feed direction. The third support can, for example, be a conventional double-T beam. This additionally simplifies the construction of the device.

The first support can be held in a groove on the upper side, and the second support on a rail on the lower side of the third support. In that way, a simple brace is created for the first support, which is normally considerably larger, and a compact and precise mounting for the second support, which is normally comparatively small.

It is particularly preferred that at least one of the first gripping mechanisms which is adjacent to the second gripping mechanism can be moved relative to the first support from a lowered advancing position into a raised rest position and back, and that the height of a clearance below the first gripping mechanism, in its raised rest position, corresponds to at least the maximum height of a stack of workpieces which can be gripped by the second gripping mechanism. In that way, the stack of workpieces that is gripped by the second advancing device can protrude into the first working width, and the second advancing device can nevertheless move this stack of workpieces, if required, and do so completely independently of the first advancing device. This again considerably increases the flexibility of the inventive plate divider-system. In doing so, the gripping mechanisms of both advancing devices are moved upward into the rest position, so that the space underneath the advancing area is not affected by this function. In this way, the supporting table on which the plate-shaped workpieces lie can be relatively low, which facilitates operation.

As a further development, it is proposed that the direction of movement of the first gripping mechanism from the first advancing position into the rest position, when viewed from the direction of feed, runs in a slanting manner to the rear. Then, the gripping mechanisms which are in the rest position relative to the other first gripping mechanisms, when viewed in the direction of advance, are disposed in an offset manner toward the rear. In this way, the first advancing mechanism can be moved very close to a saw-line, for example, even with the first gripping mechanisms in the rest position, without the first gripping mechanisms, which are in the rest position, colliding with a press beam in the area of the sawing-line. And finally, by means of this measure, a more precise cut is provided.

It is also proposed that the second working width be a width that amounts to less than 10%, and in particular less than 4%, of the feed area. Correspondingly, the second advancing mechanism is then small, and therefore light and of a simple construction. Nevertheless, with a plate divider-system configured in this way, almost all popular cutting patterns, or as the case may be dividing patterns, can be realized.

Another embodiment provides for the plate divider-system to be part of an angular arrangement. Then the higher number of cycles is particularly useful.

In addition, the first support and the second support can be arranged side-by-side; the two supports therefore do not overlap, because the first support is arranged laterally to the second working width. This simplifies construction.

It is an advantage in terms of procedural technique if the second advancing device, in the rest position of the second gripping mechanism, is moved into a position that is close to a working area, particularly one that is close to a sawing-line. In this way, time and energy are conserved, when the user of the panel divider-system wants to "couple" a workpiece to the second advancing device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
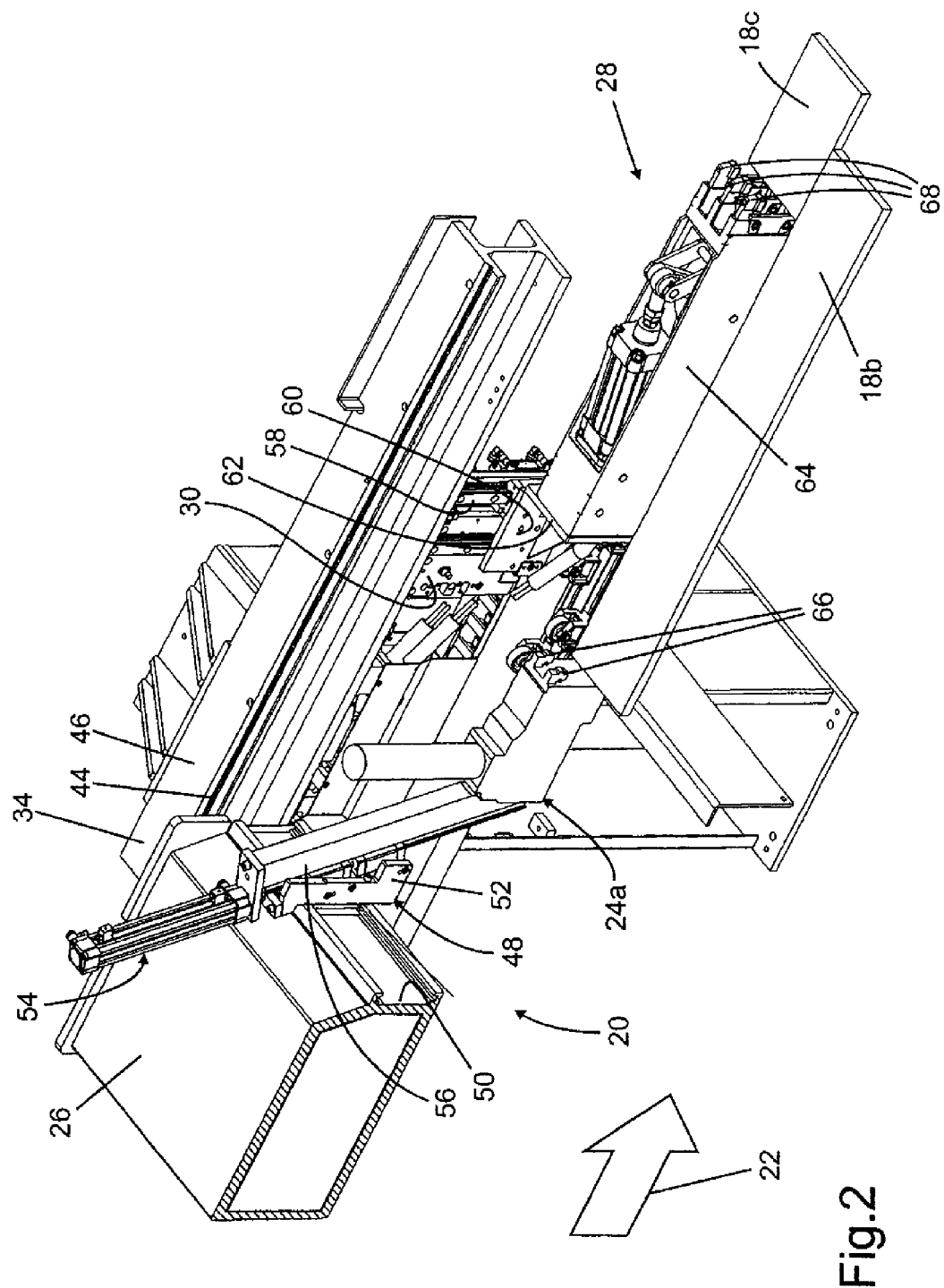
Figure 3:
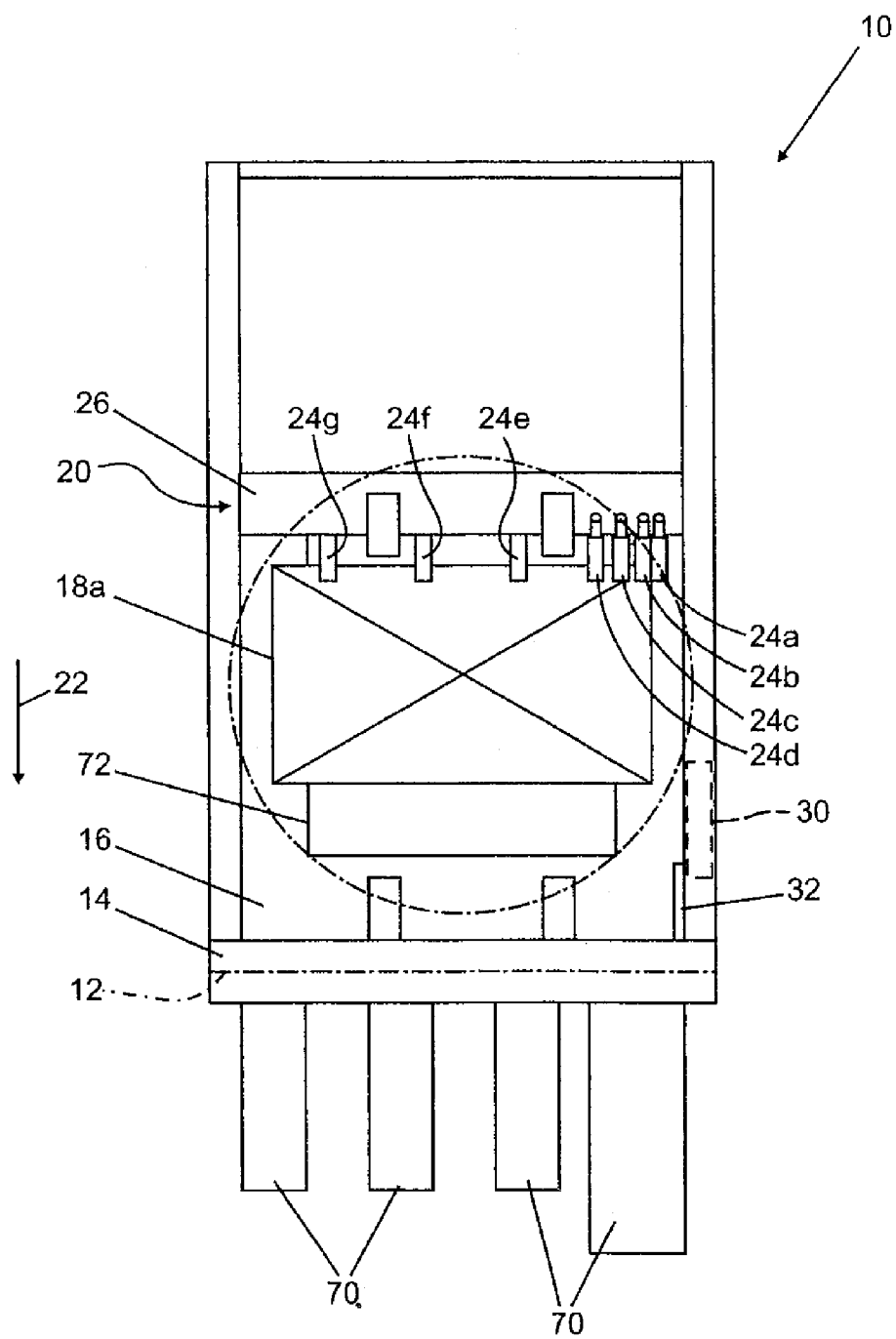
Figure 4:
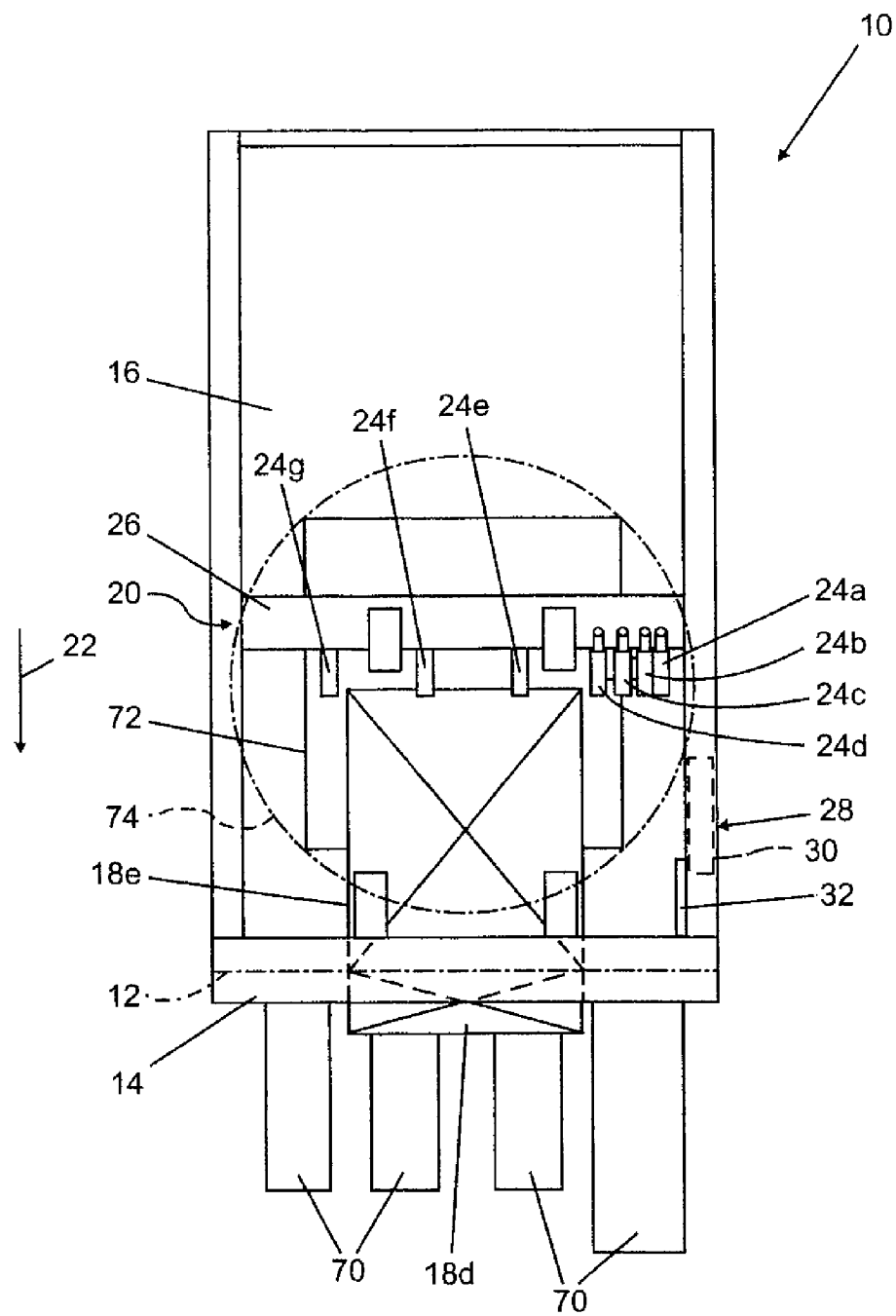
Figure 5:
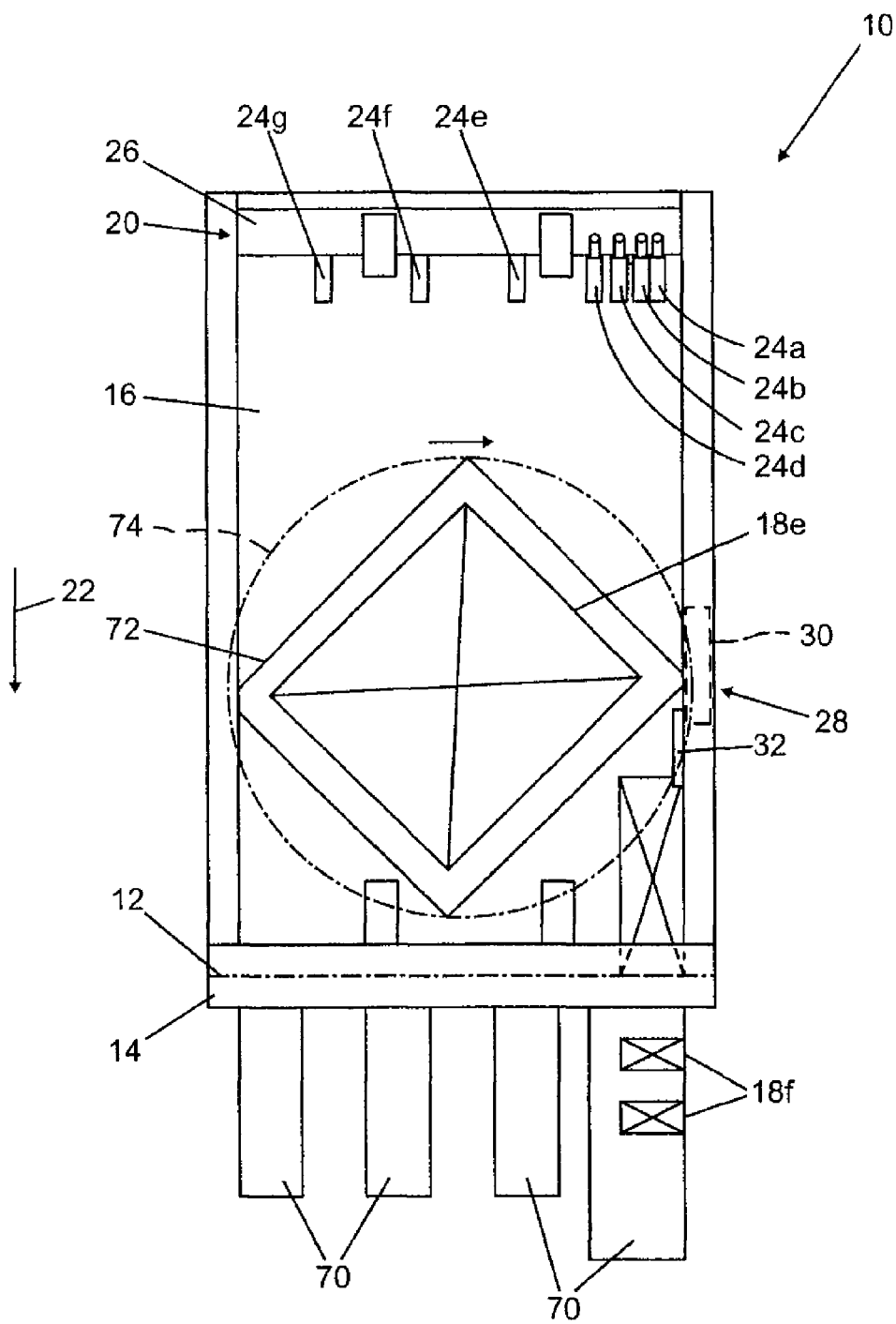
Figure 6:
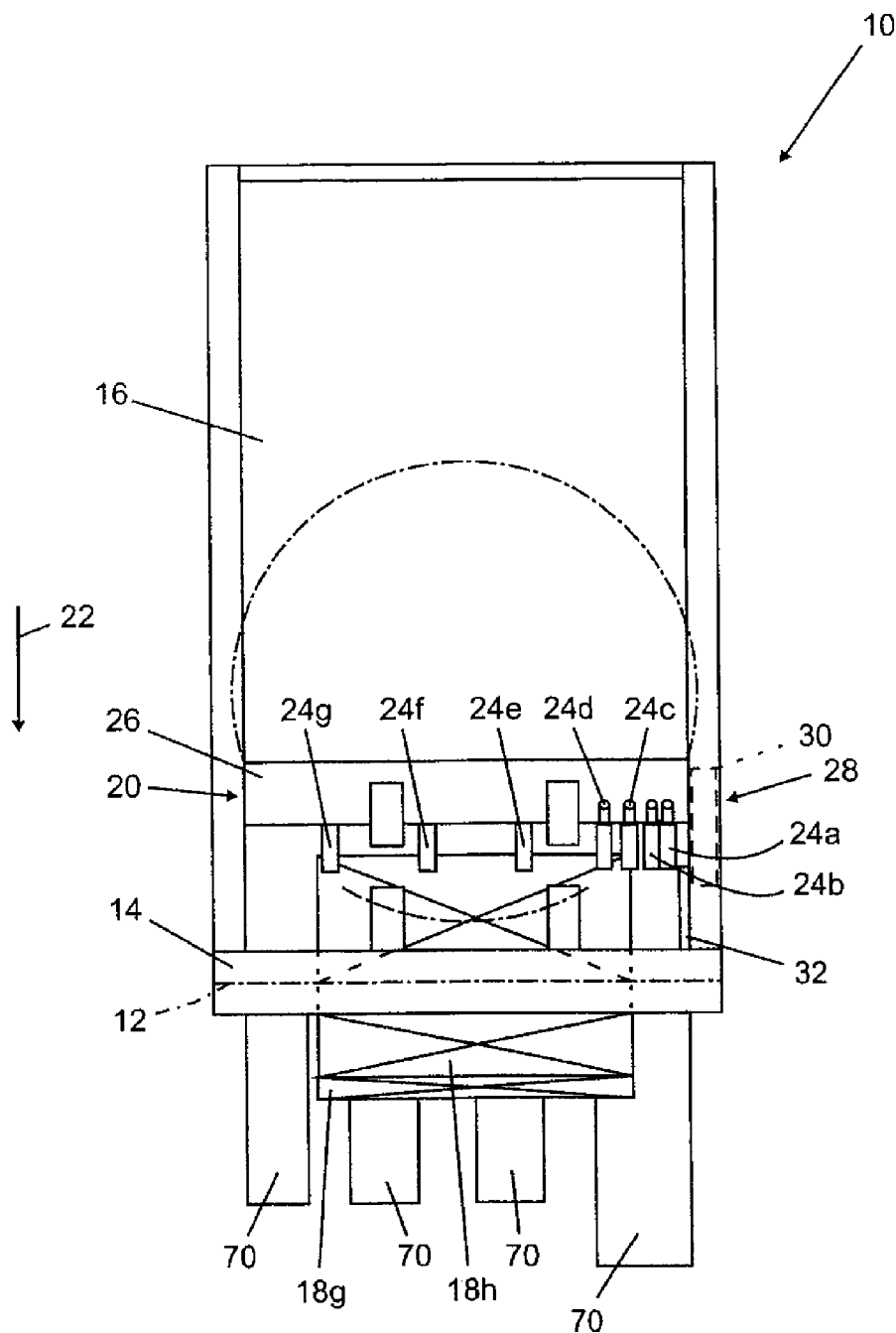
Figure 7:
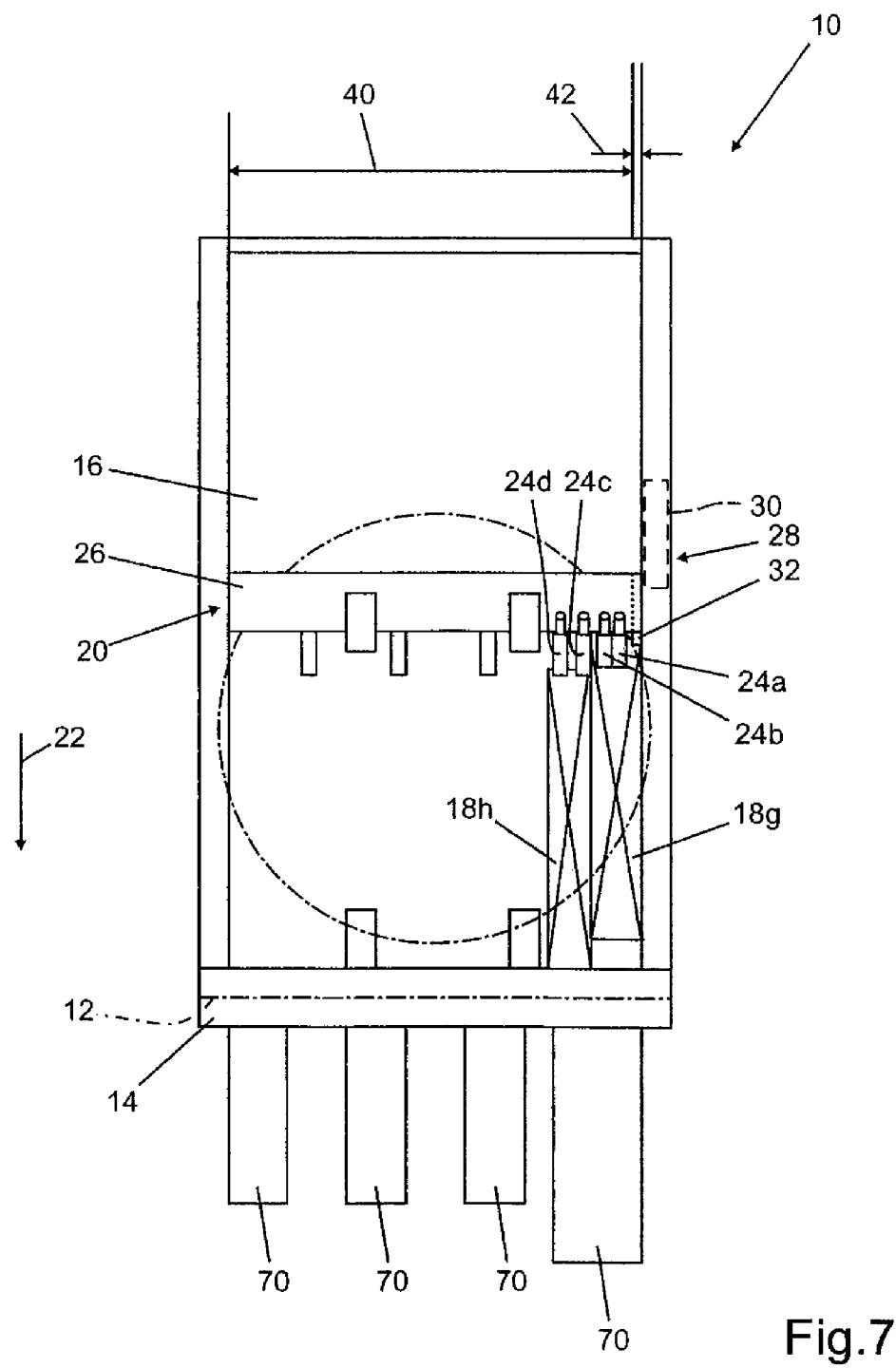

In order that the invention may be well understood, there will now be described an embodiment thereof, given by way of example, reference being made to the accompanying drawing, in which:

FIG. 1 an overhead view of a plate divider-system with a first advancing device and a second advancing device in a starting position;

FIG. 2 a perspective view of a second advancing device and a part of the first advancing device;

FIG. 3 a view similar to FIG. 1 of the plate divider-system in a second operating state;

FIG. 4 a view similar to FIG. 1 of the plate divider-system in a third operating state;

FIG. 5 a view similar to FIG. 1 of the plate divider-system in a fourth operating state;

FIG. 6 a view similar to FIG. 1 of the plate divider-system in a fifth operating state;

FIG. 7 a view similar to FIG. 1 of the plate divider-system in a sixth operating state; and FIG. 8 a schematic view of an alternative embodiment of a plate-divider system.

DETAILED DESCRIPTION

The following description is merely exemplary in nature and is not intended to limit the present disclosure, application, or uses.

A plate divider-system as a whole is given the reference sign 10 in FIG. 1. It includes a saw, which is however not shown in FIG. 1. Only the saw-line is indicated by means of a dot-dashed line. Above the saw-line, there is a press beam 14.

The plate divider-system 10 also includes a worktable 16, which is formed, for example, by a variety of rollers (not shown). In the starting configuration of the plate divider-system 10 shown in FIG. 1, a stack of plate-shaped workpieces 18a is lying on the worktable 16. Said stack can be moved by a first advancing device 20 in the feed direction (arrow 22) and also against the feed direction 22, when the stack of workpieces 18 is gripped by first gripping mechanisms 24a to 24g. They are mounted on a first support 26.

The plate divider-system 10 also includes a second advancing device 28 which, in the rest position shown in FIG. 1, is arranged in very close proximity to the sawing-line 12. The second advancing device 28 comprises a second support 30 on which a second gripping mechanism 32 is affixed laterally in the direction of the worktable 16.

The second support 30, as will be described in more detail below, is affixed to the underside of a third support 34, which extends parallel to the advancing device 22 and laterally defines the worktable 16. Parallel to the third support 34, on the other side of the worktable 16, there is a fourth support 36. The first support 26 is deposed like a portal on the upper side of the third support 34, or as the case may be, the fourth carrier 36 in a manner that will be depicted in greater detail later.

A feed area 38 is defined transverse to the advancing device 22 by the worktable 16 and the two supports 34 and 36, in which feed area the workpieces 18 to be moved by the advancing devices 20 and 28 can be arranged. The feed area 38, in turn, features a first working width 40, diagonal to the feed direction 22, and a second working width 42, which are marked on FIG. 1 by the corresponding width-indicating arrows. The first working width 40 is defined by the first gripping mechanisms 24a to 24g being arranged inside it, and the second working width 42 is defined by the gripping device 32 being arranged inside it. It can be seen from FIG. 1 that the first working width 40 is immediately adjacent to the second working width 42, but that it does not overlap it. It can also be seen from FIG. 1 that the second support 30 is arranged laterally outside the advancing area 38 or, as the case may be, the second working width 42.

The first advancing device 20 and the second advancing device 28 will now be explained in more detail with reference to FIG. 2. It can be seen from FIG. 2 that the first support 26 is positioned to the side of the third support 34 and deposed by means of a roller conveyor, which is not visible, in a groove 44 on the upper side 46 of the third support 34, which is configured as a double-T beam. The deposition of the first support 26 on the fourth support 36 is a mirror image of this.

FIG. 2 shows one of the first gripping mechanisms 24, which carries the index a. The gripping mechanism 24a is fixed by a bracket 48 to the front side 50 of the first support 26, which points toward the sawing-line 12. The bracket comprises a base part 52 rigidly attached to the first support 26, on which a piston rod (not visible) of a pneumatic cylinder 54 is connected. The cylinder housing (without reference number) of the pneumatic cylinder 54 is connected to the upper end of an extension 56, on the lower end of which the first gripping mechanism 24a is affixed. The extension 56, seen from the side or as the case may be in the longitudinal direction of the first support 26, is guided in a slanted manner on the base part 52, and the upper end, to be sure, is further to the rear in terms of the feed direction 22, than the lower end. Correspondingly, the pneumatic cylinder 54 is also positioned in a slanted manner.

As a result, when the pneumatic cylinder 54 is in operation, the extension 56, along with the first gripping mechanism 24, is moved not only upward, but also toward the rear, when viewed in the direction of feed 22. When that happens, the lowered front position is described as "feed position," which is shown in FIG. 2. The raised and retracted position is called the "rest position." Of the seven first gripping mechanisms 24a to 24g, only the four gripping mechanisms 24a to 24d, which are at least approximately adjacent to the second advancing device 28, can be moved from a front feed-position to a rear rest-position and back. The other first gripping mechanisms 24e to 24g have rest positions and feed positions lying vertically one above the other.

The second support 30 of the second advancing device 28 is configured as a sliding carriage that is carried in a longitudinally displaceable manner on a rail, which is not visible in FIG. 2, on the underside of the third support 34. On the inner side of the second support 30, pointing in the direction of the feed area 38, a linear guideway 58 is positioned outside the work area 42. A guide plate 60 of the second gripping mechanism 32 is held against said guideway so as to displace. Fastened at a right angle to the guide plate 60 is a holding plate 62 that extends inward toward the feed area 38. On the side of said holding plate that points in the direction of feed 22, a longitudinal, box-shaped housing 64 of the second gripping mechanism 32 is, in turn, fastened in a rigid manner.

Both gripping mechanisms 24 and 32 have upper and lower gripper jaws on their ends that point in the direction of feed 22. Although the lower gripper jaw is fixed, the upper gripper jaws can be moved in a vertical direction. In that way, workpieces can be clamped between the gripper jaws of a gripping mechanism 24 and 32, said workpieces being depicted as examples in FIG. 2 and given the reference numbers 18b and 18c. The lower gripper jaws of the gripping mechanisms 24 and 32 are hidden by these workpieces 18b and 18c; the upper gripper jaws are designated as 66 and 68. The lowered position of the gripping mechanism 32 relative to the carriage 30 is also termed "feed position," whereas the raised position relative to the carriage 30, into which the gripping mechanism can be moved by means of a control device, which is not shown, is termed "rest position."

It can be seen from FIGS. 1 and 2 that the second working width 42, which is defined by the width of the second gripping mechanism 32, is obviously smaller than the first working width 40, inside which the first gripping mechanisms 24a to 24g are arranged, at least during an advancing movement. In the embodiment shown here, the width of the second working width 42 makes up only approximately 4% of the total feed area 38, which is comprised of the first working width 40 and the second working width 42.

In addition, FIG. 2 also shows, that the height of the clearance (without reference number) under the second gripping mechanism 32 in its raised rest position approximately corresponds to the maximum height of a stack of workpieces 18b which can be grasped by the first gripping mechanism 24. In the same way, the height of the clearance between the lower side of the first gripping mechanism 24 and the worktable 16 in the raised rest position of the first gripping mechanism 24 approximately corresponds to the maximum height of a stack of workpieces 18c that can be grasped by the second gripping mechanism 24.

On the side of the sawing-line 12 facing away from the worktable 16 or, as the case may be, the press beam 14, the plate divider-system 10 shown in FIG. 1 has a removal platform 70 consisting of a variety of component parts. From said platform, as described in detail below, the workpieces 18 which have been divided by the saw can removed by an operator of the plate divider-system 10, or in order to be divided again, they can conveyed back to the first advancing device 20 and/or the second advancing device 28.

In addition, the plate divider-system 10 has a turntable 72 in the area of the worktable 16. The maximum outside radius described in one revolution of the turntable 72 is indicated in FIG. 1 by a dot-and-dash line with the reference number 74. In addition, there are, on the one hand, on the press beam 14, and on the other hand, on the first support 26, two alignment stops 76, which, similar to the gripping mechanisms 24 and 32, can be moved from a lowered working position into a raised rest position and back.

A method of dividing the stack of workpieces 18a shown in FIG. 1 will now be described with reference to the FIGS. 1 and 3 to 7. In the starting position shown in FIG. 1, the first advancing device 20 is at the rear end of the worktable 16, whereas the second advancing device 28 is located near the sawing-line 12. The first gripping mechanisms 24a to 24d, like the second gripping mechanism 32, are in their raised rest position.

The first advancing device 20 is now moved in the feed direction 22, with lowered and (seen in the direction of feed) alignment stops 76 running at the front, until the stack of workpieces 18a is aligned between the alignment stops 76. Now the advancing device 20 moves forward until the workpieces are lying on the worktable 16. Then the alignment stops 76 are retracted as the advancing device 20 moves forward, until the workpieces lie against the previously opened gripping mechanisms 24a to 24g. Now the gripping mechanisms 24a to 24g are closed. This is shown in FIG. 3.

The first gripping mechanisms 24a to 24g now release the stack of workpieces 18a, and the first advancing device 20 moves backward, far enough, at least, so that none of the first gripping mechanisms 24a to 24g are inside the radius line 74. The stack of plates 18a is now turned so that the stack extends in the longitudinal direction of the worktable 16. Now the first advancing device 20 again moves in the direction of feed 22, grips, with the first gripping mechanisms 24e and 24f, the rear edge of the turned stack of workpieces 18a and moves it toward the sawing-line 12. In these cycles, therefore, only those gripping mechanisms 24a to 24g are closed, which are just now in the area of the stack of workpieces 18a. There, a so-called "head-cut" is carried out, the corresponding head piece is marked as 18d in FIG. 4, the remaining stack as 18e.

While the first advancing device 20 moves back against the direction of feed 22 taking the remaining stack 18e with it as far as the turntable 72, the operator of the plate divider-system 10 removes the head-cut from 18d from the removal platform 70, turns it by 90°, steers the second advancing device 28 in such a way that the second gripping mechanism 32 is moved into its lowered advancing position, moves the head-cut 18d toward the second gripping mechanism 32, and causes the second gripping mechanism 32 to close. Then the second advancing device 28 is moved back, and then immediately moved again in the feed direction 22 with the sawing-device activated. In that way, the head-cut 18d is divided into end-pieces 18f.

As soon as the second advancing device 28 has moved far enough in the direction of feed 22 to be outside the radius line 74, the turntable 72 is activated and the remaining stack 18e lying on it is turned by 90°. This state is shown in FIG. 5. It is self-evident that the remaining stack 18e is released beforehand by the first gripping mechanisms 24e and 24f, and that the first advancing device 20 has been moved backward out of the area of the radius line 74.

The remaining stack 18e, which has now been turned, is now gripped again by the first gripping mechanisms 24c to 24g, and then the first advancing device 20 is moved in the direction of feed 22 toward the sawing-line 12, where the remaining stack 18e is divided into strips 18g and 18h. This is shown in FIG. 6. While this is happening, the second advancing device 28 is in its position adjacent to the sawing-line 12, and the second gripping mechanism 32 is in its raised rest position. The remaining strips 18g and 18h are turned on the removal platform 70 by 90° by the person operating the plate divider-system 10 and again conveyed to the two advancing devices 20 and 28.

As can be seen in FIG. 7, the outermost remaining strip 18g on the right in this figure is wider than the second working width 42, or as the case may be, wider than the second gripping mechanism 32. This remaining strip 18g is nevertheless gripped by the second gripping mechanism 32. However, in order for its movement not to be obstructed by the first advancing device 20, the second gripping mechanisms 24a and 24b are moved into their raised rest positions. The remaining strip 18h on the left in FIG. 7 is gripped by both of the second gripping mechanisms 24c and 24d. The two advancing devices 20 and 28 are now moved independently of each other in the direction of feed 22, toward the sawing-line 12, so that when cut by the saw, pieces of different lengths of the two remaining strips 18g and 18h are cut off.

In an embodiment that is not shown, it is also possible for a stack of workpieces to be gripped by the first gripping mechanism 24 and extend into the second working width 42. In order for the movement of the first advancing device 20 not to be obstructed by the second gripping mechanism 32, the latter is then moved into its raised rest position.

It is an evident advantage of the described plate divider-system 10, that while the second advancing device 28 works off one or more workpieces 18 with the second gripping mechanism 32, the first advancing device 20 can already be moved against the direction of feed 22, in order to fetch, grasp, turn, align, etc. a new stack of workpieces 18. In this way, the waiting time for the saw can be reduced and output increased.

Another embodiment is shown in FIG. 8. Here, elements and areas that have equivalent functions to previously described elements and areas have the same reference numbers. They are not described again in detail.

In FIG. 8, the plate divider-system 10, in the form of a transverse cutting system 10, is integrated as a subcomponent into an angular arrangement 90. The angular arrangement 90 also comprises a longitudinal divider system 78 with an advancing device 80, a worktable 82, and a longitudinal saw 84 with a sawing-line 86. The advancing device of the longitudinal divider system 78 is marked by an arrow 88. It lies at an angle of approximately 90° to the advancing device 22 of the transverse cutting system 10. The same applies to the relative position of the two sawing-lines 12 and 86.

In the longitudinal divider-system 78, with the angular arrangement 90 shown in FIG. 8, a first partial piece, or as the case may be a first partial stack, will be sawn off a first large-format panel or a stack of large-format plates. The piece or pieces will then be transported to the worktable 16 of the transverse divider-system 10 and divided up there according to the method described in FIGS. 1 to 7.

In an embodiment that is not shown in a drawing, the first support and the second support are arranged side-by-side. The two supports thus do not overlap, which is the case because the first support is arranged laterally to the second working width, or as the case may be, laterally to the second gripping mechanism. This is made possible, for example, by the third support extending across and beyond the second working width with the second gripping mechanism, whereby sufficient clearance should be provided for a movement of the second gripping mechanism, or as the case may be a plate stack transported by it, beneath the area of the third support that extends over and beyond the second working width.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. A plate dividing-system for dividing plate-shaped workpieces with a first advancing device for moving plate-shaped workpieces, the first advancing device comprising a first support and a plurality of first gripping mechanisms, the plate dividing-system having a second advancing device for moving plate-shaped workpieces, the second advancing device comprising a second support and at least one second gripping mechanism, and the plate dividing-system having a feed area defined transversely in relation to a direction of feed, inside which feed area a workpiece to be moved by the first advancing device in the direction of feed and a workpiece to be moved by the second advancing device in the direction of feed are arranged, and which feed area comprises a first wide area defined transversely in relation to the direction of feed, in which the first gripping mechanisms are arranged at least during an advancing movement, and a second wide area, in which second wide area the second gripping mechanism is arranged, whereby the second support is arranged laterally outside the feed area, and wherein the first advancing device and the second advancing device are movable independently of each other is characterized in that:
   a. the first wide area being immediately adjacent to the second wide area, wherein the wide areas do not overlap,
   b. the second gripping mechanism is always arranged laterally of the second support and thus is constantly in the second wide area,
   c. the second gripping mechanism is movable relative to the second support from a lowered advancing position into a raised rest position and back, and
   d. the height of the clearance underneath the second gripping mechanism, in its raised rest position corresponds to at least the maximum height of a stack of workpieces that are gripped by the first gripping mechanism.

2. The plate divider-system according to claim 1, characterized in that the first support and the second support are movably held by a common third support that is arranged parallel to the advancing direction.

3. The plate divider-system according to claim 2, characterized in that the first support is held in a groove on an upper side and the second support on a rail on a lower side of the third support.

4. The plate divider-system according to claim 1, characterized in that at least one of the first gripping mechanisms, which is adjacent to the second gripping mechanism, is movable from a lowered advancing position into a raised rest position and back relative to the first support, and that the height of the clearance underneath the first gripping mechanism, in its raised rest position, corresponds to at least the maximum height of a stack of workpieces that is gripped by the second gripping mechanism.

5. The plate divider-system according to claim 4, characterized in that the direction of movement of the first gripping mechanism from the advancing position into the rest position, when viewed in the advancing direction, runs in an inclined direction to the rear.

6. The plate divider-system according to claim 1, characterized in that the second wide area has a width of less than 10% of the width of the feed area.

7. The plate divider-system according to claim 6, characterized in that the second wide area is 4% of the width of the feed area.

8. The plate divider-system according to claim 1, characterized in that the system is part of an angular plate divider-arrangement.

9. The plate divider-system according to claim 1, characterized in that the first support is arranged laterally to the second wide area.

10. The plate divider-system according to claim 1, wherein at least one of the first advancing device grips a first workpiece or, as the case may be, a first stack of workpieces and the second advancing device grips a second workpiece, or as the case may be a second stack of workpieces.

11. The plate divider-system according to claim 10, characterized in that the first workpiece or, as the case may be, the first stack of workpieces extends into the second wide area.

12. The plate divider-system according to claim 10, characterized in that the second workpiece or, as the case may be, the second stack of workpieces extends into the first wide area.

13. The plate divider-system according to claim 10, characterized in that the second advancing device in the rest position of the second gripping mechanism, is moved into a position that lies in the vicinity of a processing area, in particular in the vicinity of a sawing-line.

* * * * *